US010275866B1

United States Patent
Hsu

(10) Patent No.: US 10,275,866 B1
(45) Date of Patent: Apr. 30, 2019

(54) EXTRACTING OVERLAPPING SIGNALS FROM IMAGES

(71) Applicant: MorphoTrust USA, LLC, Billerica, MA (US)

(72) Inventor: Rein-Lien Hsu, Edison, NJ (US)

(73) Assignee: MorphoTrust USA, LLC, Billerica, MA (US)

( * ) Notice: Subject to any disclaimer, the term of this patent is extended or adjusted under 35 U.S.C. 154(b) by 300 days.

(21) Appl. No.: 15/223,442

(22) Filed: Jul. 29, 2016

Related U.S. Application Data

(60) Provisional application No. 62/198,940, filed on Jul. 30, 2015.

(51) Int. Cl.
| | |
|---|---|
| *G06T 5/40* | (2006.01) |
| *G06K 9/00* | (2006.01) |
| *G06K 9/48* | (2006.01) |
| *G06K 9/52* | (2006.01) |
| *G06K 9/46* | (2006.01) |
| *G06T 7/11* | (2017.01) |

(52) U.S. Cl.
CPC ............. *G06T 5/40* (2013.01); *G06K 9/0008* (2013.01); *G06K 9/4642* (2013.01); *G06K 9/482* (2013.01); *G06K 9/522* (2013.01); *G06T 7/11* (2017.01)

(58) Field of Classification Search
None
See application file for complete search history.

(56) References Cited

U.S. PATENT DOCUMENTS

2013/0051478 A1* 2/2013 Wu .................. H04N 19/159
375/240.25

OTHER PUBLICATIONS

Jain, A.—"Latent Palmprint Matching"—IEEE 2009, pp. 1032-1047.*
Chen et al., "Separating Overlapped Fingerprints," Information Forensics and Security, IEEE Transactions on , vol. 6, No. 2, pp. 346,359, Jun. 2011.
Feng et al., "Robust and Efficient Algorithms for Separating Latent Overlapped Fingerprints," Information Forensics and Security, IEEE Transactions on , vol. 7, No. 5, pp. 1498,1510, Oct. 2012.
Indovina et al., "ELFT-EFS Evaluation of Latent Fingerprint Technologies: Extended Feature Sets [Evaluation #1] ," NIST IR 7775, 62 pages, Mar. 2011.
Zhao and Jain, "Model Based Separation of Overlapping Latent Fingerprints," Information Forensics and Security, IEEE Transactions on , vol. 7, No. 3, pp. 904,918, Jun. 2012.

* cited by examiner

*Primary Examiner* — Bernard Krasnic
(74) *Attorney, Agent, or Firm* — Fish & Richardson P.C.

(57) ABSTRACT

Image data is obtained. The image data is divided into a plurality of segments. A frequency spectrum is generated for each segment. One or more dominant signals corresponding to the image data are estimated for each segment based on the associated frequency spectrum. A coherent enhancement process is applied to the one or more dominant signals in each segment by performing sequential scanning in one or more directions. For each of the one or more dominant signals, the data resulting from the coherent enhancement of the signal are stored into separate image buffers, wherein an image buffer is configured to store data resulting from the coherent enhancement of the associated dominant signal across multiple segments. Each of the one or more dominant signals are reconstructed based on aggregating the data stored in a corresponding image buffer.

27 Claims, 8 Drawing Sheets

EXTRACTING OVERLAPPING SIGNALS FROM IMAGES

CROSS REFERENCE TO RELATED APPLICATIONS

This application claims the benefit of priority under 35 U.S.C. § 119(e) of U.S. Provisional Application No. 62/198,940, filed on Jul. 30, 2015, and entitled "Extracting Overlapping Signals from Images," which is incorporated herein by reference in its entirety.

TECHNICAL FIELD

The following disclosure relates generally to extracting overlapping signals present in an image.

BACKGROUND

An image may include data or signals for one or more objects, e.g., fingerprints. These signals may be embedded in a complex background of the image. The signals may overlap with signals corresponding to other objects present in the image.

SUMMARY

The following disclosure describes methods, systems and computer program products for reconstructing one or more dominant signals that are embedded in an image. The dominant signals may overlap with other dominant signals or ridge-like patterns, or with complex background information of the image. In some implementations, components of the dominant signals are extracted individually by applying circular histogram to the frequency spectra of image segments to estimate the signal components. A coherent enhancement process is applied to the estimated signal components to dispense the components into image buffers based on ridge flow and sequential scanning. The dominant signals are reconstructed by aggregating the extracted signal components stored in the respective image buffers.

In a general aspect, image data is obtained. The image data is divided into a plurality of segments. A frequency spectrum is generated for each segment. One or more dominant signals corresponding to the image data are estimated for each segment based on the associated frequency spectrum. A coherent enhancement process is applied to the one or more dominant signals in each segment by performing sequential scanning in one or more directions. For each of the one or more dominant signals, the data resulting from the coherent enhancement of the signal are stored into separate image buffers, wherein an image buffer is configured to store data resulting from the coherent enhancement of the associated dominant signal across multiple segments. Each of the one or more dominant signals are reconstructed based on aggregating the data stored in a corresponding image buffer.

Particular implementations may include one or more of the following features. Estimating one or more dominant signals for each segment may comprise generating a circular histogram for the frequency spectrum associated with each segment. Applying the coherent enhancement process to the one or more dominant signals in each segment by performing sequential scanning in one or more directions may comprise applying the coherent enhancement process to the one or more dominant signals in each segment by performing sequential scanning in four directions.

Generating the frequency spectrum for each segment may comprise applying a spectrum analysis to each segment using a frequency transform algorithm. The frequency transform algorithm may include windowed Fourier transform.

Storing the data resulting from the coherent enhancement of each of the one or more dominant signals into separate image buffers may comprise, for each segment, concurrently storing the data resulting from the coherent enhancement of the one or more dominant signals included in the segment into respective image buffers.

At least one of the one or more dominant signals corresponding to the image data may be associated with a fingerprint image.

For each of the reconstructed one or more dominant signals, a flow pattern for the dominant signal may be examined. Based on the examination, a determination may be made whether the flow pattern corresponds to a fingerprint ridge pattern. The dominant signal may be identified as a fingerprint image based on determining that the flow pattern corresponds to a fingerprint ridge pattern.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above-described actions. One such computer-readable medium stores instructions that, when executed by a processor, are configured to cause the processor to perform one or more of the above described actions. One such system includes one or more processors and a storage device storing instructions that, when executed by the one or more processors, cause the one or more processors to perform the above-described actions.

The details of one or more disclosed implementations are set forth in the accompanying drawings and the description below. Other features, aspects, and advantages will become apparent from the description, the drawings and the claims.

DETAILED DESCRIPTION

Figure 1:
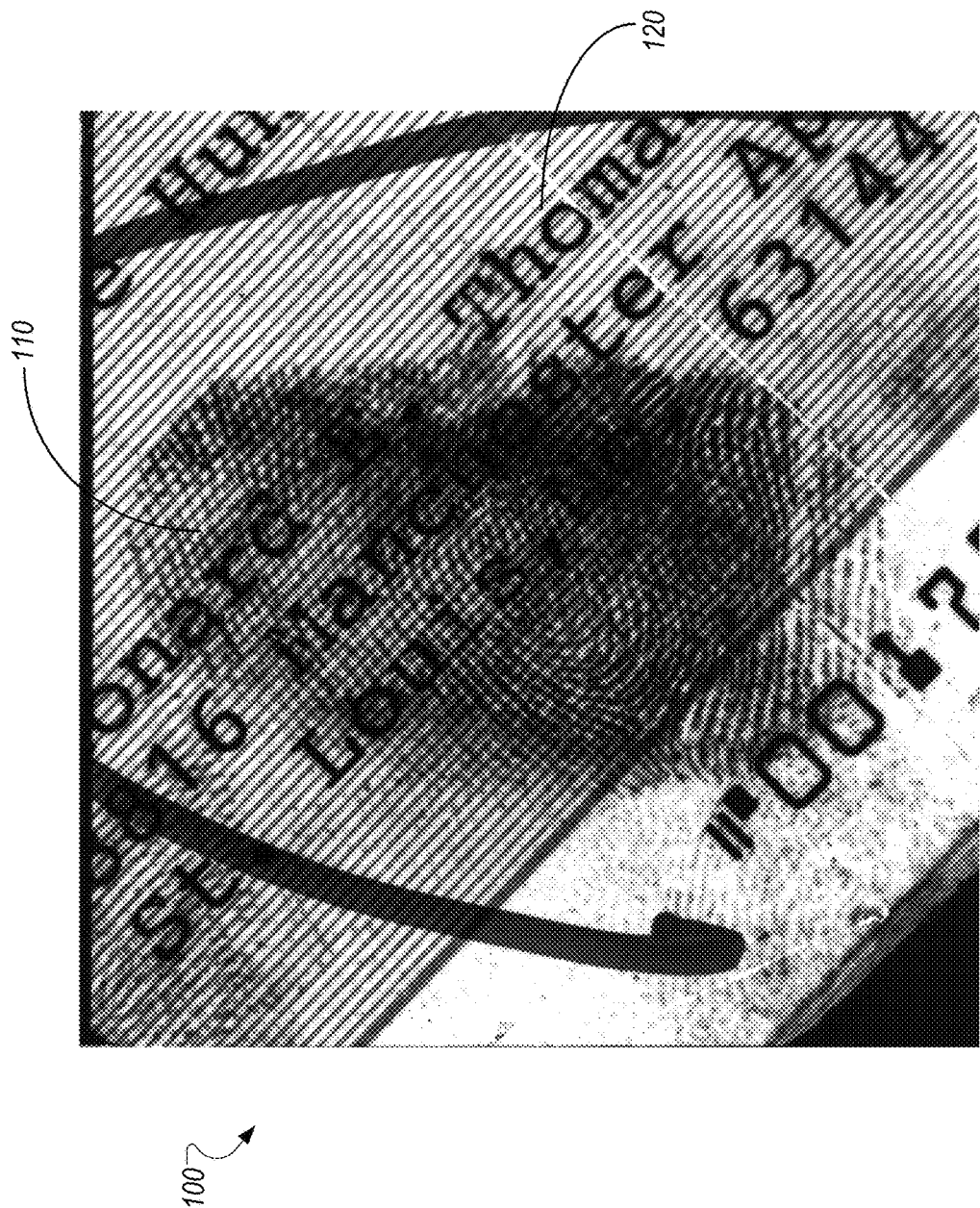
FIG. 1 shows an example of an image that includes a dominant signal overlapping with another dominant signal.

An image can include data superimposed on background information of the image. The superimposed data, which are referred to as dominant signals, may correspond to certain overlaid objects that can be separated from the background information. In some implementations, more than one such dominant signal may be embedded in an image. The dominant signals may overlap with one another, or they may overlap with the image background information, or both. For example, FIG. 1 shows an example of an image 100 that includes a dominant signal represented by 110 overlapping with another dominant signal represented by 120.

One or more of the dominant signals may represent objects that are included in the image when generating the item corresponding to the overall image, while other dominant signals may represent objects imprinted on the generated item. For example, the item may be a financial paper check (such as a bank check) and the image 100 may be an image of a portion of the financial paper check. The dominant signal 120 may represent the check design, check number and/or payment details that are included in the blank check paper when the check is generated. In contrast, the dominant signal 110 may represent a fingerprint that is placed on the check when the check is handled by individuals.

It may be useful to separate a dominant signal in an image from the background information of the image, and/or to separate multiple overlapping dominant signals in an image from one another. Separating the dominant signals may allow examination of individual dominant signals or the background information of the image to obtain information that may be obscured by the overlapping. For example, by separating the dominant signal 120, information about the check design, check number and/or payment details that are obscured by the dominant signal 110 may be obtained.

In some implementations, a separated dominant signal may be matched to known patterns to determine a type of the object represented by the dominant signal. For example, upon extracting the dominant signal 110 from the image 100, the flow pattern of the dominant signal 110 may be examined and matched to a fingerprint ridge pattern. In this manner, the dominant signal 110 may be identified as corresponding to a fingerprint.

The following portion describes technologies to extract and reconstruct, from an image, one or more dominant signals that may overlap with other dominant signals or ridge-like patterns, and/or may overlap with complex background information of the image. The technologies may be used for extracting one or more dominant signals from images with accuracy and in a resource-efficient manner. The technologies further may be used for determining if the extracted dominant signals correspond to fingerprints or other types of objects.

Figure 2A:
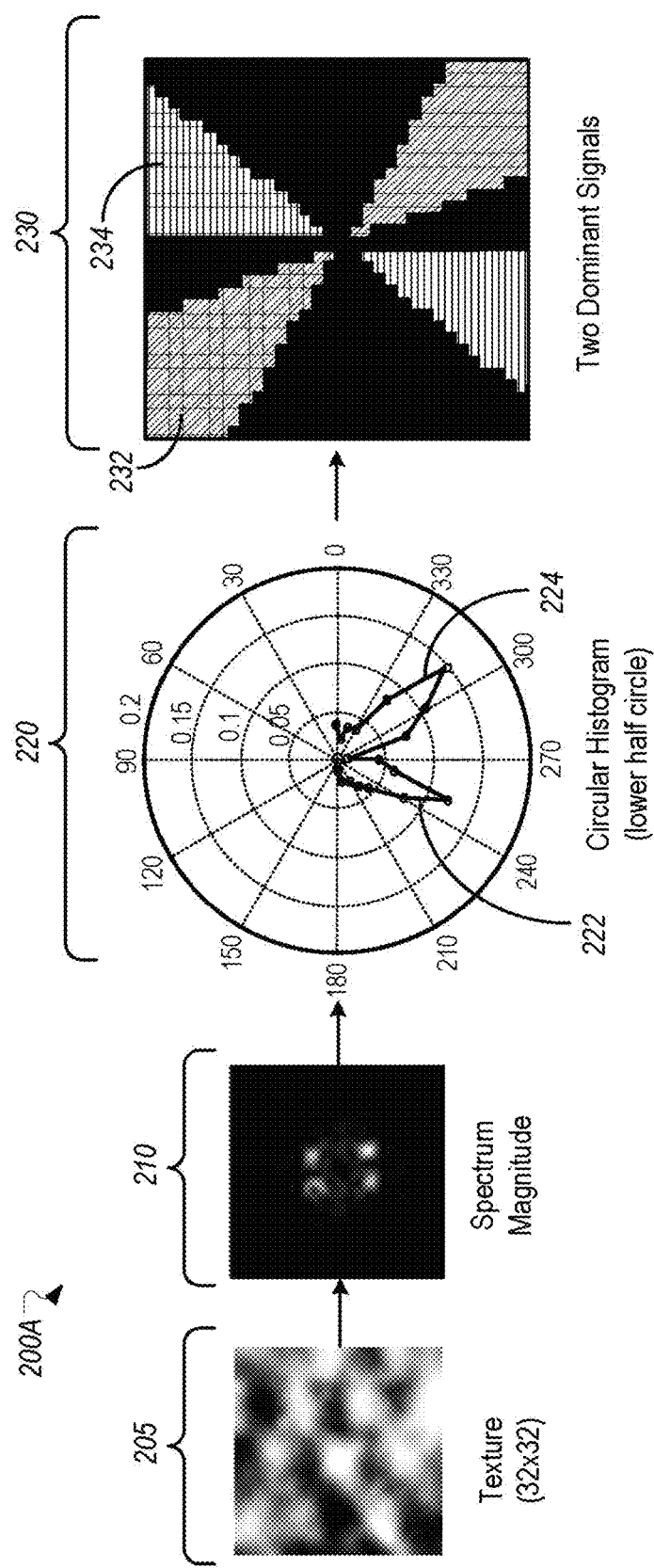
FIGS. 2A and 2B illustrate an example of a technique for extracting and reconstructing dominant signals from an image.
Figure 2B:
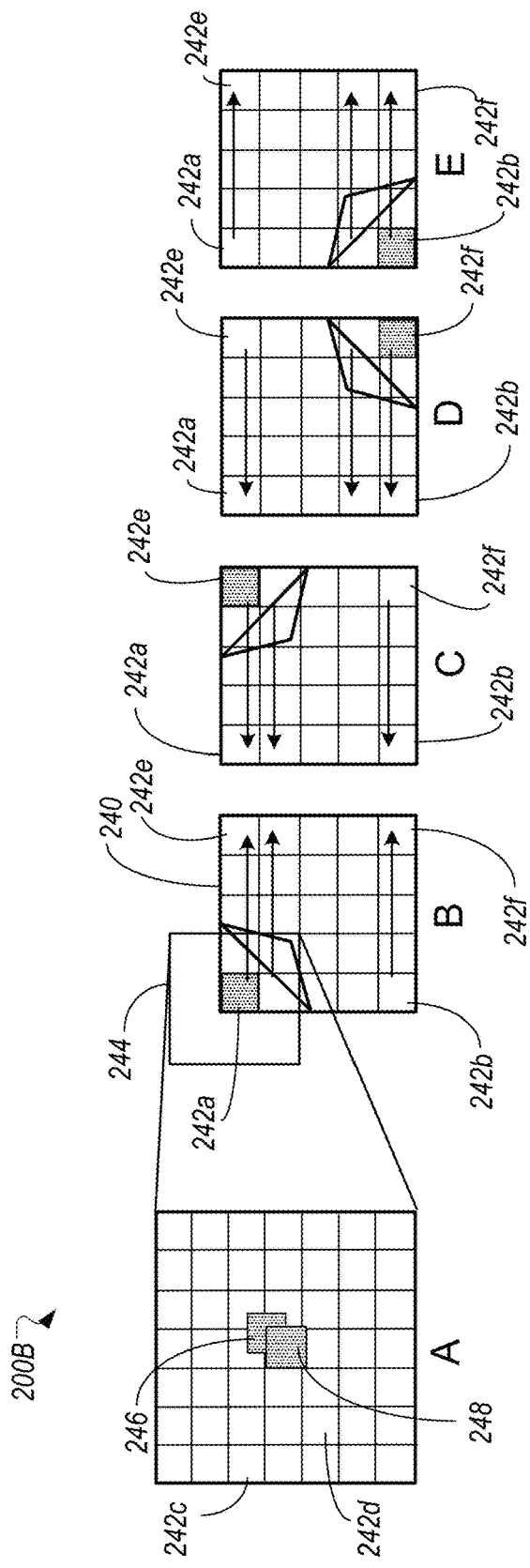

FIGS. 2A and 2B illustrate an example of a technique 200 for extracting and reconstructing dominant signals from an image. In some implementations, the technique 200 is composed of a dominant signal component estimation approach 200A of FIG. 2A, and a coherent enhancement technique 200B of FIG. 2B.

In the technique 200, estimates of dominant signal components included in an image are first obtained, which is shown by the approach 200A in FIG. 2A. As shown in the example of FIG. 2A, a frequency spectrum 210 of a segment 205 of an image is obtained. The frequency spectrum is provided as an input to an estimation tool 220, which outputs at 230 estimates of dominant signal components 232 and 234 included in the segment.

In the approach 200A, an input image is divided into portions or sub-images, which are referred to as segments, e.g., segment 205. A spectrum analysis is performed on each segment to generate a frequency spectrum corresponding to the information included in the segment. For example, the texture of segment 205 is spectrally analyzed and frequency spectrum 210 corresponding to the analyzed texture is obtained.

In some implementations, a spectrum analysis based on windowed Fourier transform is applied to each segment. By performing the windowed Fourier transform, the sinusoidal frequency and phase content of local components of dominant signals included in each image segment may be determined. In some implementations, a polar coordinate system is used in the Fourier space to perform the windowed Fourier transform. This may lead to accurate estimates of orientation of dominant signals. In some implementations, other suitable spectrum analysis tools may be used as an alternative to windowed Fourier transform, e.g., wavelet transform, Fractional Fourier transform, etc.

The frequency spectrum generated for each segment, e.g., 210, is then applied as input to an estimation tool 220, as shown, to estimate the dominant signal components included in the segments. In some implementations, a circular histogram is used in the estimation tool 220. In some implementations, alternative image threshold selection algorithms may be used in the estimation tool 220. For example, the image threshold selection algorithm employed may be a different histogram shape-based method, a clustering-based method, an entropy-based method, or some other suitable algorithm.

In some implementations, when circular histogram is used, the estimation tool 220 assumes that the frequency spectrum in an input segment (e.g., spectrum 210 of segment 205) includes several different classes of pixels (foreground pixels and background pixels) following a bi-modal or multi-modal histogram. For example, if a segment includes two dominant signal components, it may follow a bi-modal distribution, but if a segment includes additional dominant signal components, the frequency spectrum may correspond to a multi-modal histogram. The estimation tool 220 computes histogram and probabilities of each intensity level present in the frequency spectrum, and then calculates optimum thresholds separating the different classes of pixels so that their combined spread (intra-class variance) is minimal, or equivalently, so that their inter-class variance is maximal.

The histogram that is generated for a segment is cyclically rotated so that selected thresholds are shifted to zero. In some implementations, the estimation tool 220 applies the above procedure and histogram rotation until several heuristics, e.g., involving class size, threshold location, and class variance are satisfied. In some implementations where a bi-modal histogram is obtained, the histogram is smoothed until it has only two peaks. Applying a circular histogram approach, the histogram is cyclically rotated so that the midpoint between the peaks is shifted to zero. In some implementations, the estimation tool 220 applies the above procedure and histogram rotation iteratively until convergence of the thresholds. In some implementations where a bi-modal histogram is obtained, the histogram is split into two halves and a solution is obtained efficiently in linear rather than quadratic time.

As shown in the example of FIG. 2A, the frequency spectrum 210 of the input image segment 205 may include two dominant signal components, such that the estimation tool 220 computes a circular histogram with two peaks 222 and 224.

The estimation tool 220 provides at the output 230 estimates of dominant signal components present in the frequency spectrum of the input image segment. Continuing with the above example, estimates of two dominant signal components 232 and 234 are provided. As shown, the estimates of the signal components 232 and 234 are represented by different ridge directions of two different dominant signals that are identified by the estimation tool 220 as being present in the image segment 205. In this context, ridge directions indicate orientations of signals included in an image, e.g., signal components 232 and 234.

In the above manner, using circular histogram in the estimation tool 220, improved estimation of true angles of the ridge directions of the dominant signal components 232 and 234 may be obtained, leading to detection of the embedded data in an image with improved accuracy. In contrast, other approaches, such as mean-angle based approach or peak-angle based approach, may result in less accurate on-angle estimation. For example, in the mean-angle based approach uses Cartesian coordinate system in the Fourier space to estimate dominant signals in the Fourier spectrum. This may lead to less separation between the estimated dominant signal components in image segments compared to the separation using a circular histogram approach, which uses a polar coordinate system in the Fourier space as noted above. Accordingly, a mean-angle based approach may provide less accuracy in estimating/detecting dominant signals in an image in comparison to using circular histogram based approach as described here.

After obtaining estimates of dominant signal components present in each image segment as described with respect to the approach 200A, a coherent enhancement process is applied to the estimates to collect together components from different segments that are associated with the same dominant signal. FIG. 2B shows an example of a coherent enhancement technique 200B that is applied to dominant signal components output by the estimation tool 220.

An example image 240 is shown in FIG. 2B as divided into multiple segments, such as 242a, 242b, 242c, 242d, 242e and 242f. A close up view of a section 244 of the image 240 is shown by FIG. 2B(A), which illustrates multiple segments, such as 242c and 242d among others, that include dominant signals 246 and 248. The dominant signal components 232 and 234 may correspond to the dominant signals 246 and 248. As shown, a dominant signal, e.g., 246, may be spread across more than one segment. Although two dominant signals are shown, in some implementations the image may include one, or more than two dominant signals, as described previously.

In the coherent enhancement technique 200B, the segments of the image 240 are scanned sequentially from four image scanning directions. As shown by FIG. 2B(B), in some implementations, the image is scanned one segment at a time left to right and then top to bottom. For example, segment 242a is scanned first, followed by segments to its right along the row, such as segment 242e. Once all the segments in the row are scanned, the next row down is scanned left to right, and so on till all the rows are scanned top to bottom, ending with the row that includes segments 242b and 242f, with segment 242b being scanned prior to scanning segment 242f.

Subsequent to the scanning of FIG. 2B(B), in some implementations the image is scanned one segment at a time in the reverse direction, i.e., right to left and then top to bottom, as shown in FIG. 2B(C). For example, segment 242e is scanned first, followed by segments to its left along the row, such as segment 242a. Once all the segments in the row are scanned, the next row down is scanned right to left, and so on till all the rows are scanned top to bottom, ending with the row that includes segments 242b and 242f, with segment 242f being scanned prior to scanning segment 242b.

After scanning the segments in the two horizontal directions of FIG. 2B(B) and FIG. 2B(C), in some implementations, the image is scanned by reversing the vertical direction as shown by FIGS. 2B(D) and 2B(E). For example, as shown in FIG. 2B(D), the image is scanned one segment at a time right to left and then bottom to top. In the example shown, segment 242f in the bottom row is scanned first, followed by segments to its left along the row, such as segment 242b. Once all the segments in the row are scanned, the next row up is scanned right to left, and so on till all the rows are scanned bottom to top, with the segments 242e and 242a in the topmost row being scanned last.

In some implementations, after the scanning direction of FIG. 2B(D), the image is scanned one segment at a time left to right and then bottom to top, as shown by FIG. 2B(E). In the example shown, segment 242b in the bottom row is scanned first, followed by segments to its right along the row, such as segment 242f. Once all the segments in the row are scanned, the next row up is scanned left to right, and so on till all the rows are scanned bottom to top, with the segments 242a and 242e in the topmost row being scanned last.

In scanning each segment directionally in the sequential manner above, characteristics, such as ridge flow direction, of the dominant signal components that have been estimated for each segment are examined. For each segment, the scanning enhances (i.e., makes more distinct in comparison to other information in the segment) dominant signal components (e.g., signals 232 or 234) with ridge flow that correspond to the direction of scanning. Based on the examination, the enhanced dominant signal components are extracted and stored in separate image buffers associated with each dominant signal. For example, a dominant signal corresponding to signal component 232 may have a ridge direction that is oriented left to right and top to bottom, while a dominant signal corresponding to signal component 234 may have a ridge direction oriented right to left. Accordingly, signal component 232 may be enhanced for extraction by scanning the segments left to right as shown in FIGS. 2B(B) and 2B(E), while signal component 234 may be enhanced for extraction by scanning the segments right to left as shown in FIGS. 2B(C) and 2B(D). Information corresponding to the extracted signal components 232 and 234 are stored in separate image buffers associated with the corresponding dominant signals.

In some implementations, the dominant signals may not be oriented precisely horizontally or vertically. However, the sequential scanning in each direction can tolerate a certain range of flow deviations (e.g., +/−45 degrees in the four directions). Accordingly, in such cases, scanning sequentially in the four directions as shown above may be useful to extract information about the associated dominant signal components in each scanning direction. In some implementations, additional scanning directions (e.g., four diagonal directions) may increase the accuracy of the extracted dominant signals.

While the above description of FIG. 2B illustrates sequential scanning of the image segments in particular directions in an order, in some implementations the order in which the different directions are scanned may be different. For example, the segments in an image may be scanned bottom to top first, or right to left first, or some other suitable order of scanning directions different from the above. In some implementations, the scanning in any particular direction may commence or end with different segments than those shown above. For example, scanning may start with a middle segment in a row, or end with a middle segment in a row. In some implementations, the directions of scanning may be different. For example, scanning may be performed in a diagonal direction, either from bottom to top, or vice versa. Alternatively, scanning may be performed in a circular manner, e.g., starting with a segment and then proceed in a clockwise or counter-clockwise direction with adjacent segments. Other suitable order or direction of scanning also may be implemented.

After all the segments have been scanned, in some implementations the dominant signals present in the image are reconstructed by aggregating the extracted signal components stored in each image buffer. For example, the dominant signal corresponding to signal component 232 is reconstructed by aggregating the signal components (including 232) that are stored in the buffer in which signal component 232 is stored. Similarly, the dominant signal corresponding to signal component 234 is reconstructed by aggregating the signal components (including 234) that are stored in the buffer in which signal component 234 is stored.

In some implementations, the dominant signals present in the image are reconstructed by aggregating a subset of the extracted components stored in each image buffer. For example, a statistical analysis may be performed on the signal components stored in a buffer and outliers (e.g., signal components that deviate from the mean or median by more than a threshold) may be discarded. The remaining components may then be aggregated to reconstruct the corresponding dominant signal.

In the above manner, after reconstruction, primary and secondary dominant signals present in an image are rendered. In some implementations, there may be multiple primary and/or multiple secondary dominant signals, for example, when an image includes more than two dominant signals.

In contrast to the coherent enhancement technique 200B that uses sequential scanning to extract dominant signals, other processes may use alternative techniques, such as modeling. In these alternative techniques, known object recognition models (e.g., scalable belief networks or Bayesian networks) may be applied to estimates of dominant signal components to identify dominant signals in an image. The coherent enhancement technique 200B may reconstruct dominant signals embedded in an image with greater accuracy compared to the modeling-based processes.

Figure 3A:
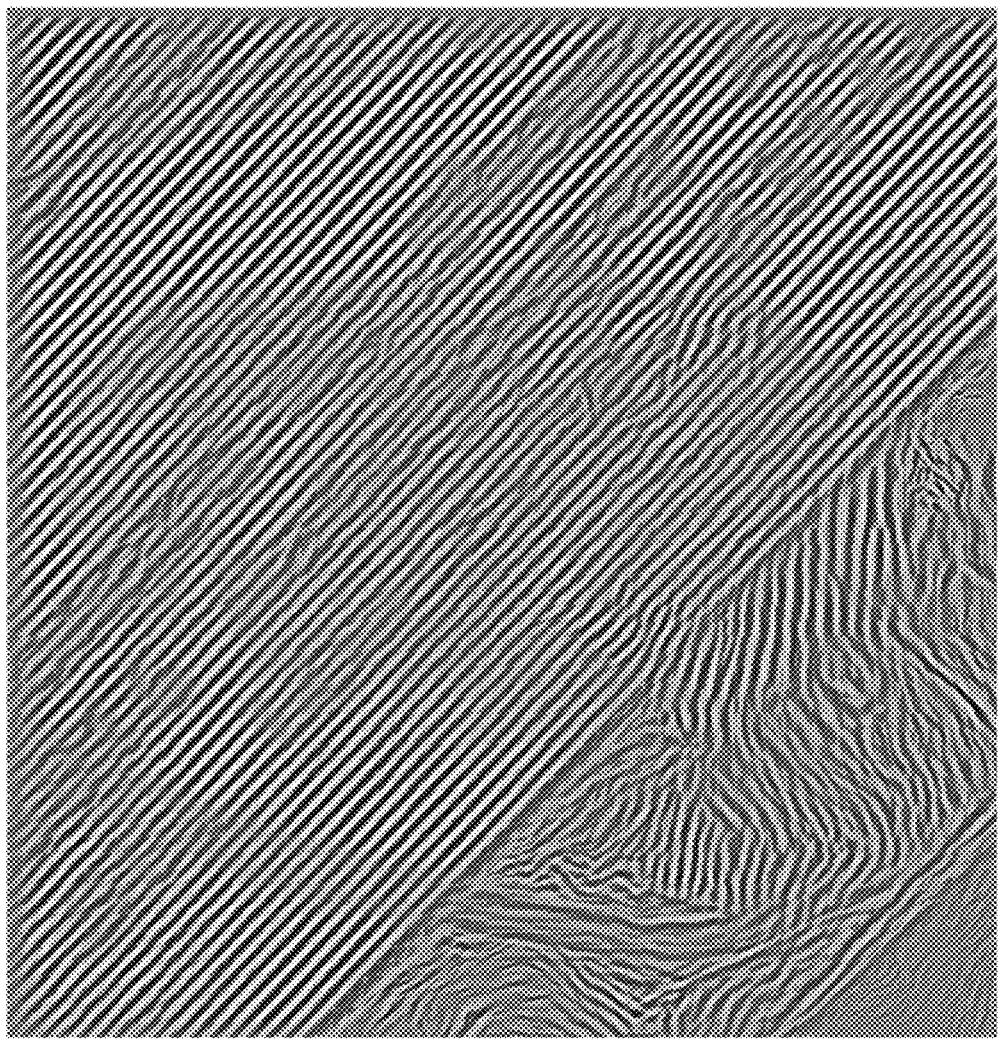
FIGS. 3A and 3B illustrate examples of first and second dominant signals that are obtained by applying the technique for extracting dominant signals from an image.
Figure 3B:
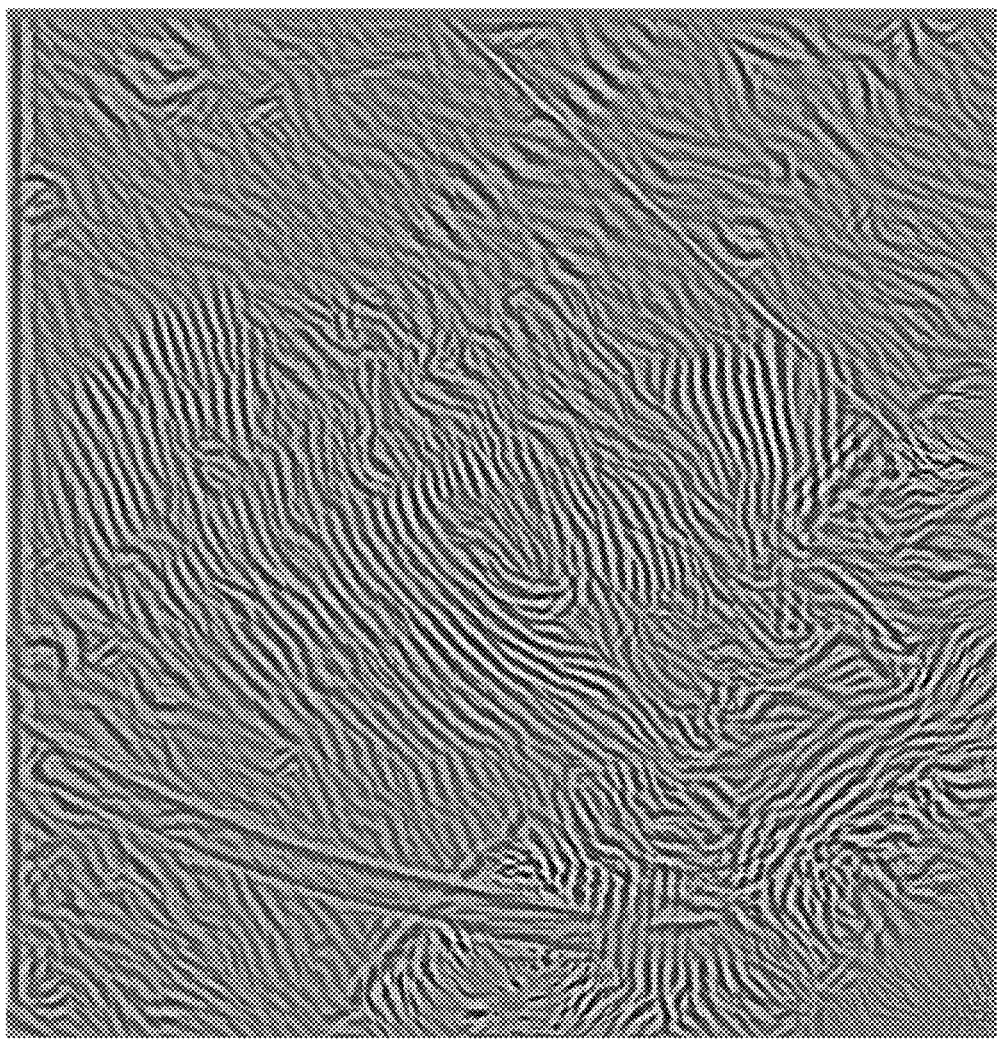

FIGS. 3A and 3B illustrate examples of first and second dominant signals 300A and 300B respectively that are obtained by applying the technique 200 for extracting dominant signals from an image.

FIG. 3A shows an example of a first dominant signal 300A in an image that is determined based on the estimation approach 200A using circular histogram, followed by the coherent enhancement technique 200B applying sequential scanning. For example, dominant signal 300A may correspond to the dominant signal component 232. The dominant signal 300A may have a ridge flow orientation that is left to right and top to bottom. Accordingly, the dominant signal 300A may be obtained by reconstructing a group of enhanced signal components that are extracted from image segments using sequential scanning in the left to right and top to bottom directions. As described previously, the extracted signal components may be stored in an image buffer specified for the associated dominant signal (i.e., 300A). Some, or all, of the signal components stored in the image buffer may be combined to reconstruct the dominant signal 300A.

FIG. 3B shows an example of a second dominant signal 300B in the image that is determined based on the estimation approach 200A using circular histogram, followed by the coherent enhancement technique 200B applying sequential scanning. For example, dominant signal 300B may correspond to dominant signal component 234. The dominant signal 300B may have a ridge flow orientation that is right to left and top to bottom. Accordingly, the dominant signal 300B may be obtained by reconstructing a group of enhanced signal components that are extracted from image segments using sequential scanning in the right to left and top to bottom directions. As described previously, the extracted signal components may be stored in an image buffer specified for the associated dominant signal (i.e., 300B). Some, or all, of the signal components stored in the buffer may be combined to reconstruct the dominant signal 300B.

In some implementations, the dominant signal 300A may correspond to the dominant signal 120 representing the check design, check number and/or payment details in the image 100 of a portion of a financial paper check, while dominant signal 300B may correspond to the dominant signal 110 representing a fingerprint on the check as shown in the image 100. Accordingly, by applying the circular histogram estimation approach 200A and the coherent enhancement technique 200B, the dominant signals embedded in the image 100 may be reconstructed as separate signals 300A and 300B.

In some implementations, one of the dominant signals may be a primary dominant signal while the other may be a secondary dominant signal. For example, dominant signal 300A may be the primary dominant signal, while 300B may be the secondary dominant signal. This may be the case, for example, when the amount of information associated with the dominant signal 300A is greater than the amount of information associated with the dominant signal 300B. However, in other cases, 300B may be the primary dominant signal, while 300A may be the secondary dominant signal. This may be the case, for example, when the dominant signal 300B is of greater interest, such as for additional processing (e.g. fingerprint matching) compared to the dominant signal 300A.

Although the above example illustrates two dominant signals 300A and 300B obtained from an image, in some implementations one, or more than two, dominant signals may be reconstructed by applying the circular histogram estimation approach 200A and the coherent enhancement technique 200B, as described above. This may be the case, for example, when a single, or three or more, dominant signals are embedded in an image.

In some implementations, additional processing may be applied to the reconstructed dominant signals. For example, pattern matching may be performed on the dominant signals to identify the types of objects that are represented by the dominant signals. For example, the flow patterns of the dominant signals 300A and/or 300B may be compared to known fingerprint ridge patterns to determine if any of these dominant signals represent a fingerprint. Based on matching the flow patterns to known fingerprint ridge patterns, dominant signal 300B may be identified as a latent fingerprint embedded in the image 100. In an analogous manner, by comparing the flow patterns of the dominant signals to known patterns of financial checks, dominant signal 300A may be identified as representing a portion of a check shown in the image 100.

In this manner, latent fingerprint fragments in an image may be separated from various other ridge-like signals (including other fingerprints, if present) that overlap with the true latent ridges of fingerprints. Applying the above techniques, a plurality of true latent fingerprint ridge signals may be accurately separated from other signals in an image.

In some implementations, upon identifying the types of the objects represented by the dominant signals, further processing may be performed on the dominant signals. For example, based on determining that the dominant signal 300B represents a fingerprint, the dominant signal 300B may be compared to known fingerprints of individuals from a database of fingerprints to identify the person corresponding to the fingerprint.

Figure 4:
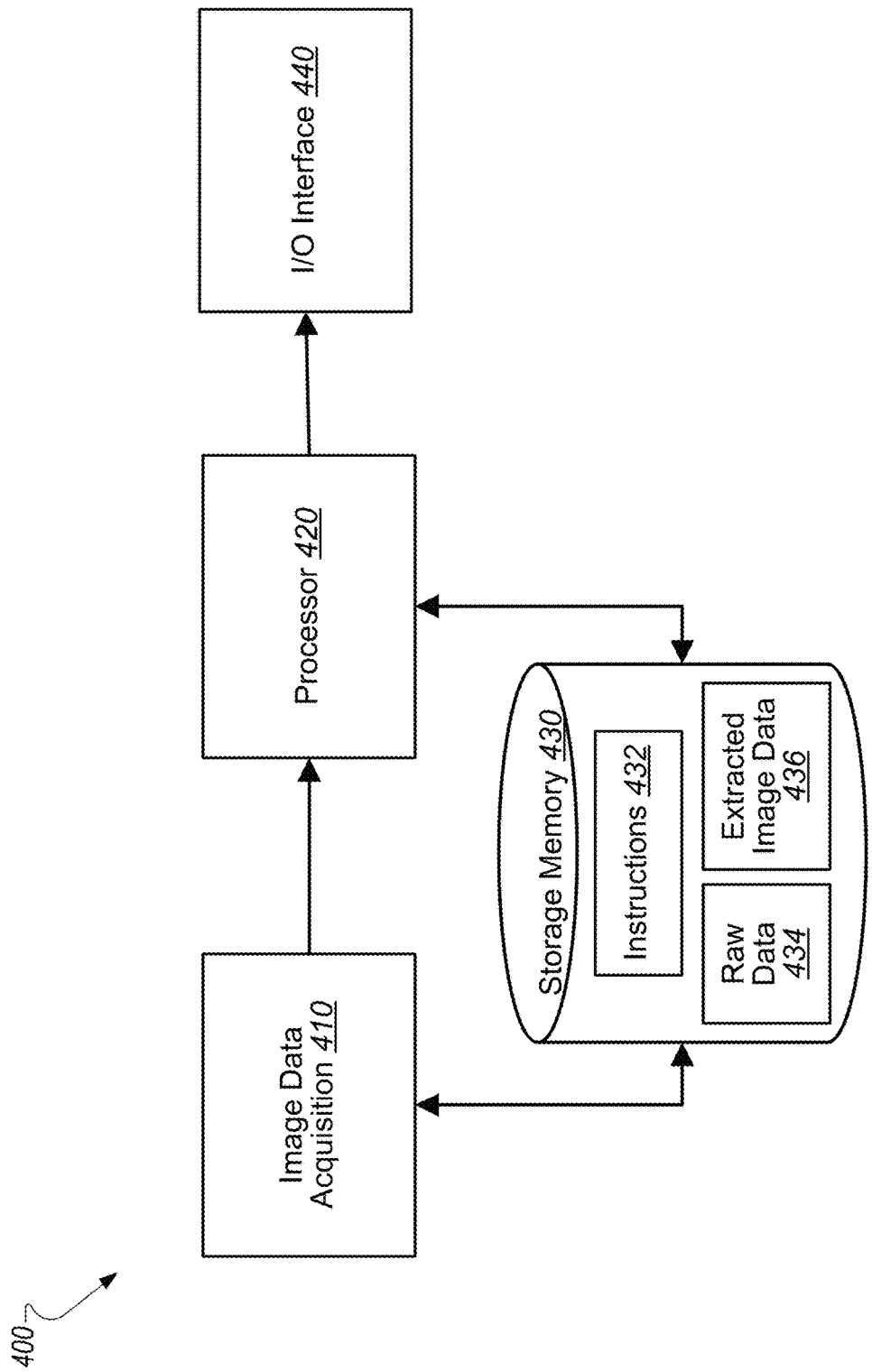
FIG. 4 illustrates a block diagram of an example system for reconstructing individual dominant signals embedded in an image.

FIG. 4 illustrates a block diagram of an example system 400 for reconstructing individual dominant signals embedded in an image. In some implementations, the system 400 may apply the technique 200 for extracting and reconstructing dominant signals from an image, including the dominant signal component estimation approach 200A, or the coherent enhancement technique 200B, or both. However, the system 400 may use other processes for extracting and reconstructing dominant signals from an image in other implementations.

In the example shown in FIG. 4, the system 400 includes an image data acquisition module 410, a processor 420, storage memory 430 and an input/output interface (I/O interface) 440. The storage memory 430 includes instructions 432, raw data 434 and extracted image data 436.

In some implementations, the system 400 may be a single hardware device that incorporates all the modules shown in FIG. 4. For example, the system 400 may be a computer with a camera or other optical input, a processor, a storage device and input/output such as a keyboard, a mouse and a display. Alternatively, the system 400 may be a portable device (e.g., a smartphone) with a camera, a processor, on board memory, a touchscreen display that also provides input functionality, and/or additional input hardware (such as hardware buttons). However, in other implementations the system 400 may include separate hardware devices that are coupled to one another. For example, the system 400 may include a scanner device that is coupled to a computer with a processor, storage memory and a display. Other suitable configurations of the system 400 are also possible.

The image data acquisition module 410 is configured to receive various images with embedded information as an input to the system. For example, the image data acquisition module 410 may receive images similar to image 100. In some implementations, the image data acquisition module 410 may include a camera to capture images, or a scanner to scan in physical copies of images, or some other suitable hardware.

In some implementations, the image data acquisition module 410 is configured to receive various inputs from a user, such as from an operator associated with the system 400. The inputs from the user may include images that are to be analyzed for extracting and reconstructing dominant signals.

In some implementations, the images acquired by the image data acquisition module 410 are provided to the processor 420 for extracting and reconstructing dominant signals present in the images. Additionally or alternatively, the images acquired by the image data acquisition module 410 may be stored in the storage memory 430, e.g., as raw data. The stored images may be processed at a later time by the processor 420.

Although one processor 420 is shown, the system 400 may include more than one processor. The processor 420 is configured to execute instructions 432 stored in the storage memory 430. In some implementations, the instructions 432 encode the technique 200 for extracting and reconstructing dominant signals from an image. For example, the instructions 432 may implement processing routines for dominant signal component estimation approach 200A, or routines for the coherent enhancement technique 200B, or both. Additionally or alternatively, the instructions 432 may encode algorithms for pattern matching of dominant signals to identify the type of objects represented by the dominant signals, such as routines for identifying whether the dominant signals correspond to fingerprints. In some implementations, the instructions 432 may implement additional or alternative routines as well, e.g., algorithms corresponding to other estimation tools or modeling tools that have been described previously.

The storage memory 430 stores the various instructions 432, the raw data 434 noted above and the extracted image data 436. The extracted image data 436 represent dominant signal components estimated by the estimation approach 200A, and/or dominant signals that are extracted and reconstructed from the image data (e.g., the raw data 434) acquired by the image data acquisition module 410. The processor 420 may extract and reconstruct these dominant signals from the image data by executing instructions 432 that encode routines corresponding to the technique 200, including routines for dominant signal component estimation using circular histogram, and routines for the coherent enhancement process using sequential scanning in different directions. Additionally or alternatively, the extracted image data 436 may represent results of pattern matching of the reconstructed dominant signals to known patterns, e.g. whether the dominant signals match to fingerprint patterns or other known patterns. In some implementations, the extracted image data 436 may include information about persons who are identified as associated with matched fingerprints, as described previously.

In some implementations, the storage memory 430 may include read-only memory (ROM) and/or random access memory (RAM). Additionally or alternatively, the storage memory 430 may include flash memory. In some implementations, the storage memory 430 may include magnetic or optical memory, such as hard disk drives, computer disc or digital video disc memory (CD-ROM or DVD-ROM), among others.

The I/O interface 440 is configured to receive various inputs from a user, such as from an operator associated with the system 400. The inputs from the user may include commands to perform the processing for determining dominant signals, or some other suitable inputs. The I/O interface 440 may include one or more of a display, a keyboard or other dedicated input hardware, a microphone and speakers. Inputs may be received through the display (e.g., touch input via a touchscreen interface shown on a touch-sensitive display), using the keyboard/dedicated input hardware, or the microphone (e.g., voice commands). Output may be provided through the display (e.g., text or graphics shown on a user interface) or through the speakers (e.g., audio output). The output may include scanned images, such as 100; results of the processor 420 executing the routines corresponding to the technique 200, such as output 230 of the estimation tool 220 (e.g., estimates of dominant signal components 232 and 234); extracted and reconstructed dominant signals, such as 300A or 300B; identification of dominant signal types based on pattern matching; or identification of persons associated with dominant signals that are determined to be fingerprints based on the pattern matching.

In some implementations, the I/O interface 440 may not be included in the system 400. In some implementations, one or more components of the I/O interface 440 may not be present. For example, the I/O interface 440 may include only a display for visual input/output.

Figure 5:
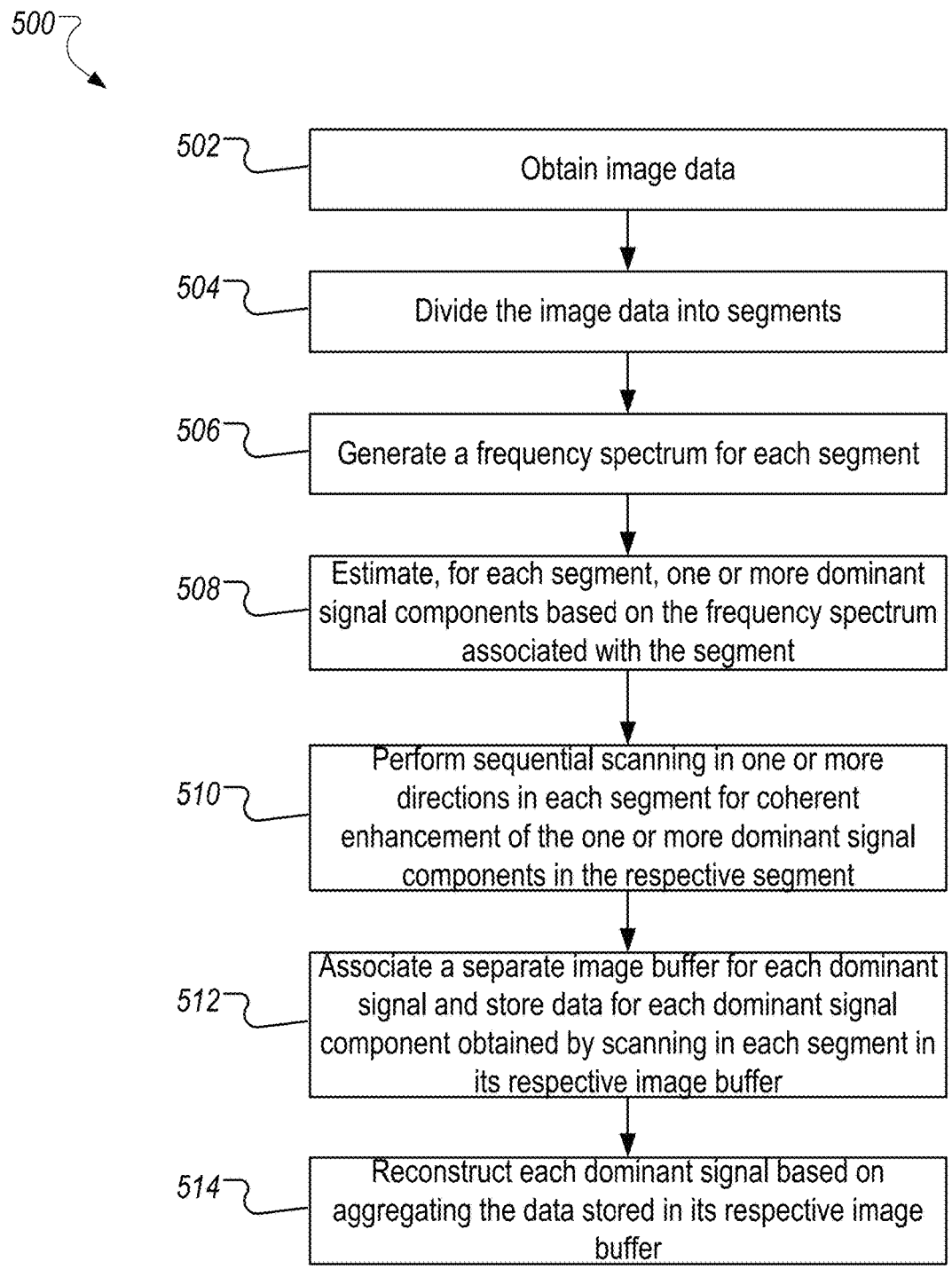
FIG. 5 illustrates an example process for extracting dominant signals from an image.

FIG. 5 illustrates an example process 500 for extracting dominant signals from an image. In some implementations, the process 500 may be performed by the system 400 and may correspond to the technique 200. Accordingly, the following section describes the process 500 with respect to the system 400 and the technique 200. However, the process 500 also may be performed by other devices or system configurations.

In some implementations, the process 500 is performed by one or more processors (e.g., processor 420) included in the system 400 that execute instructions, e.g., instructions 432, for estimating dominant signal components in segments of an image and reconstructing dominant signals from the estimates of the signal components. As described previously, these instructions may be stored in storage memory (e.g., storage memory 430) that is included in the system 400.

The process 500 starts by obtaining image data (502). For example, the image data acquisition module 410 may acquire for processing an image that includes one or more dominant signals, such as image 100 that includes dominant signals 110 and 120, or image 240. The image data may be forwarded directly to the processor 420 for signal extraction and reconstruction, and/or the image data may be stored in the storage memory 430, e.g., as raw data 434, for later processing.

The image data is divided into segments (504). For example, the processor 420 executes the instructions for extracting dominant signals from the image data, and accordingly divides the image data into a plurality of segments, such as segments 242a, 242b, etc.

A frequency spectrum is generated for each segment (506). For example, the processor 420 performs a spectrum analysis of the image data in each segment and generates a frequency spectrum corresponding to the information included in each segment. As described previously, the processor 420 may use a suitable algorithm to perform the spectrum analysis, such as windowed Fourier transform or wavelet transform.

For each segment, one or more dominant signal components are estimated based on the frequency spectrum associated with the segment (508). For example, the processor 420 uses an estimation tool, such as estimation tool 220, to estimate the dominant signal components included in the segments. As described previously, in some implementations the processor 420 performs the estimation by applying a circular histogram to the frequency spectrum of each segment. However, in other implementations, the processor 420 may use suitable alternative image threshold selection algorithms noted before.

A sequential scanning is performed in one or more directions in each segment for coherent enhancement of the one or more dominant signal components in the respective segment (510). For example, the processor 420 applies the coherent enhancement technique 200B to the segments of the image being processed and scans the segments sequentially from multiple (e.g., four) image scanning directions, such as left to right, right to left, top to bottom and bottom to top. As described previously, in sequentially scanning each segment in multiple directions, characteristics, such as ridge flow direction, of dominant signal components that have been estimated for each segment are examined. For each segment, the scanning enhances dominant signal components with ridge flow that correspond to the direction of scanning.

A separate image buffer is associated with each dominant signal and the data for each dominant signal component obtained by scanning in each segment is stored in its respective image buffer (512). For example, the processor 420 generates separate image buffers for each dominant signal corresponding to which signal components are identified by scanning in a segment. Based on sequentially scanning the image segments, the dominant signal components that are enhanced in each segment in the direction of scanning are extracted and stored in the separate image buffers associated with respective dominant signals.

Each dominant signal is reconstructed based on aggregating the data stored in its respective image buffer (514). For example, the processor 420 reconstructs the dominant signals that have been identified in the image by aggregating the dominant signal components stored in the image buffers. In some implementations, a reconstructed dominant signal corresponds to aggregation of dominant signal components in a particular image buffer, and is separate from a reconstructed dominant signal that is based on combining the dominant signal components in a separate image buffer. However, in other implementations, a dominant signal may be reconstructed by combining dominant signal components that are stored in more than one image buffer. In some implementations, more than one dominant signal may be obtained by aggregating the dominant signal components in one image buffer, or by combining groups of dominant signal components from multiple image buffers.

In the above manner, the process 500 may be used to extract and reconstruct one or more dominant signals that are embedded in an image. In some implementations, the processor 420 may store the reconstructed dominant signals in the storage memory, e.g., as extracted images 436.

Figure 6:
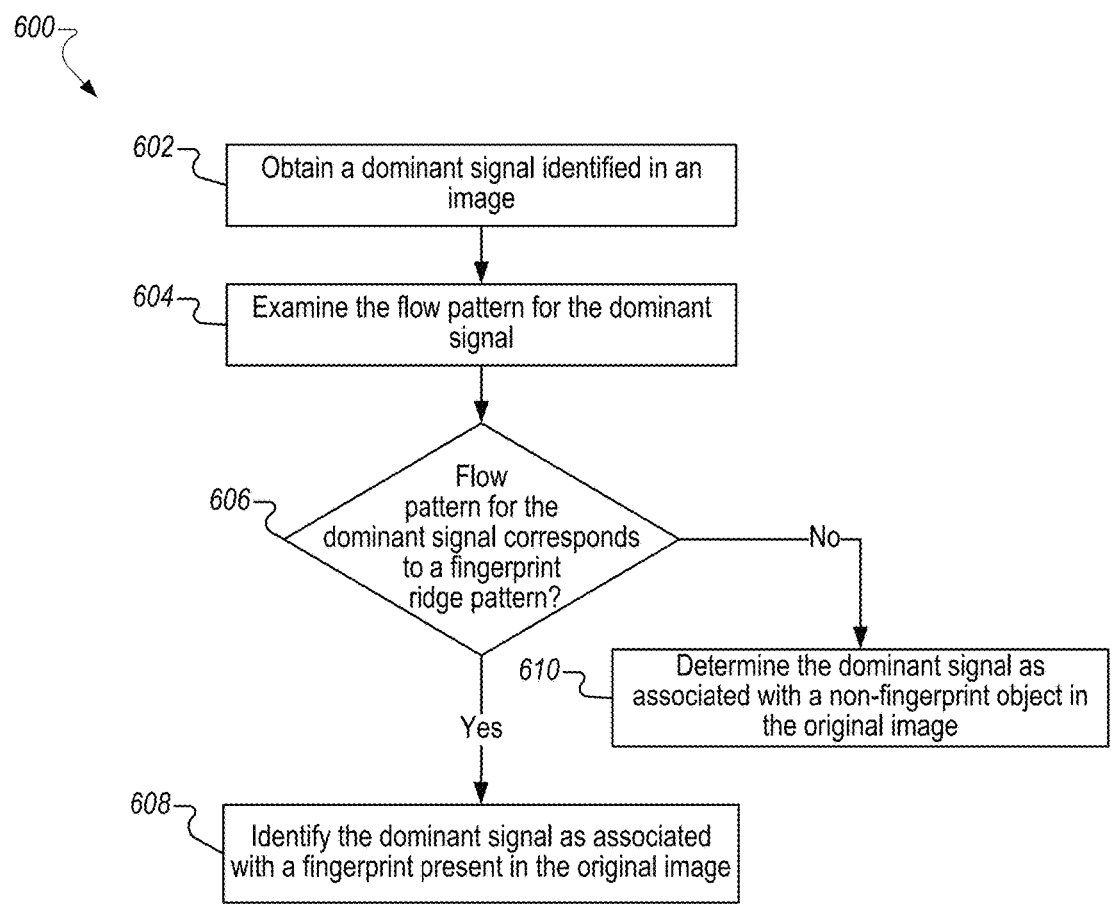
FIG. 6 illustrates an example process for determining if a dominant signal extracted from an image corresponds to a fingerprint or another type of object.

FIG. 6 illustrates an example process 600 for determining if a dominant signal extracted from an image corresponds to a fingerprint or another type of object. In some implementations, the process 600 may be performed by the system 400 and correspond to the technique 200. Accordingly, the following section describes the process 500 with respect to the system 400 and the technique 200. However, the process 500 also may be performed by other devices or system configurations.

In some implementations, the process 500 is performed by one or more processors (e.g., processor 420) included in the system 400 that execute instructions, e.g., instructions 432, for estimating dominant signal components in segments of an image and reconstructing dominant signals from the estimates of the signal components. As described previously, these instructions may be stored in storage memory (e.g., storage memory 430) that is included in the system 400.

In some implementations, the process 600 is performed in conjunction with the process 500. For example, the process 600 may be performed following the reconstruction of dominant signals in an image by aggregating the dominant signal components stored in the image buffers (514).

The process 600 obtains a dominant signal identified in an image (602). For example, the processor 420 obtains a dominant signal, such as 300B, which is extracted from the source image using the process 500. In some implementations, the processor 420 obtains a dominant signal from the extracted images 436 stored in the storage memory 430. In other implementations, the processor 420 reconstructs a dominant signal at 514, and uses the reconstructed dominant signal at 602.

The flow pattern for the dominant signal is examined (604). For example, the processor 420 examines the flow pattern of the dominant signal, such as 300B.

A determination is made whether the flow pattern for the dominant signal corresponds to a fingerprint ridge pattern (606). For example, the processor 420 compares the flow pattern for the dominant signal under examination, such as 300B, to known fingerprint ridge patterns to determine if the dominant signal represents a fingerprint.

If the flow pattern for the dominant signal is determined to correspond to a fingerprint ridge pattern, then the dominant signal is identified as associated with a fingerprint present in the original image (608). For example, the processor 420 may determine that the flow pattern for the dominant signal under examination, such as 300B, matches known fingerprint ridge patterns. Accordingly, the processor 420 may identify the dominant signal as a latent fingerprint embedded in the image, such as image 100. In this manner, latent fingerprints in an image may be extracted separately from the complex background information of the image.

In some implementations, the processor 420 may perform additional actions on the dominant signal upon identifying the signal as representing a fingerprint object in the source image. For example, based on determining that the dominant signal 300B represents a fingerprint, the processor 420 may compare 300B to known fingerprints of individuals, e.g., from a database of fingerprints, to identify the person corresponding to the fingerprint.

On the other hand, if the flow pattern for the dominant signal is determined not to correspond to a fingerprint ridge pattern, then the dominant signal is determined as associated with a non-fingerprint object in the original image (610). For example, the processor 420 may determine that the flow pattern for the dominant signal under examination, such as 300B, does not match known fingerprint ridge patterns. Accordingly, the processor 420 may determine that the dominant signal is associated with an object other than a fingerprint embedded in the image. In some implementations, the processor may perform a pattern matching of the non-fingerprint dominant signal with known patterns of other objects to identify the type of object corresponding to the dominant signal. For example, the dominant signal 300A may be identified as representing a portion of a check shown in the image 100 by comparing the flow patterns of 300A to known patterns of financial checks.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A biometric extraction method comprising:
   obtaining an image data;
   dividing the image data into a plurality of segments;
   generating, using a frequency transform algorithm, a frequency spectrum for each segment;
   estimating, for each segment and based on an associated frequency spectrum, one or more dominant signals corresponding to the image data based on a circular histogram for the frequency spectrum associated with each segment;
   applying a coherent enhancement process to the one or more dominant signals in each segment by performing sequential scanning in one or more directions;
   for each of the one or more dominant signals, storing the data resulting from the coherent enhancement process of the dominant signal into separate image buffers, wherein an image buffer is configured to store data resulting from the coherent enhancement process of an associated dominant signal across multiple segments;
   reconstructing each of the one or more dominant signals based on aggregating the data stored in a corresponding image buffer, and
   for each of the reconstructed one or more dominant signals:
      examining a flow pattern for the dominant signal,
      based on the examination, determining whether the flow pattern corresponds to a target ridge pattern, and
      identifying the dominant signal as a target object in the image data based on determining that the flow pattern corresponds to a target ridge pattern.

2. The method of claim 1, wherein estimating one or more dominant signals for each segment comprises generating the circular histogram for the frequency spectrum associated with each segment by determining histogram probabilities of intensity levels present in the frequency spectrum.

3. The method of claim 1, wherein applying the coherent enhancement process to the one or more dominant signals in each segment by performing sequential scanning in one or more directions comprises:
   applying the coherent enhancement process to the one or more dominant signals in each segment by performing sequential scanning in four directions.

4. The method of claim 1, wherein generating the frequency spectrum for each segment comprises applying a spectrum analysis to each segment using the frequency transform algorithm.

5. The method of claim 4, wherein the frequency transform algorithm includes windowed Fourier transform.

6. The method of claim 1, wherein storing the data resulting from the coherent enhancement process of each of the one or more dominant signals into separate image buffers comprises:
   for each segment, concurrently storing the data resulting from the coherent enhancement process of the one or more dominant signals included in the segment into respective image buffers.

7. The method of claim 1, wherein estimating one or more dominant signals corresponding to the image data comprises estimating two or more dominant signals corresponding to the image data.

8. The method of claim 1, wherein at least one of the one or more dominant signals corresponding to the image data is associated with a fingerprint image.

9. The method of claim 1, wherein the target ridge pattern is a fingerprint ridge pattern.

10. A non-transitory storage medium storing instructions that, when executed by one or more processors, cause the one or more processors to perform operations comprising:
    obtaining an image data;
    dividing the image data into a plurality of segments;
    generating, using a frequency transform algorithm, a frequency spectrum for each segment;
    estimating, for each segment and based on an associated frequency spectrum, one or more dominant signals corresponding to the image data based on a circular histogram for the frequency spectrum associated with each segment;
    applying a coherent enhancement process to the one or more dominant signals in each segment by performing sequential scanning in one or more directions;
    for each of the one or more dominant signals, storing the data resulting from the coherent enhancement process of the dominant signal into separate image buffers, wherein an image buffer is configured to store data resulting from the coherent enhancement process of an associated dominant signal across multiple segments;
    reconstructing each of the one or more dominant signals based on aggregating the data stored in a corresponding image buffer; and
    for each of the reconstructed one or more dominant signals:
       examining a flow pattern for the dominant signal,
       based on the examination, determining whether the flow pattern corresponds to a target ridge pattern, and
       identifying the dominant signal as a target object in the image data based on determining that the flow pattern corresponds to a target ridge pattern.

11. The non-transitory storage medium of claim 10, wherein estimating one or more dominant signals for each segment comprises generating the circular histogram for the frequency spectrum associated with each segment by determining histogram probabilities of intensity levels present in the frequency spectrum.

12. The non-transitory storage medium of claim 10, wherein applying the coherent enhancement process to the one or more dominant signals in each segment by performing sequential scanning in one or more directions comprises:
    applying the coherent enhancement process to the one or more dominant signals in each segment by performing sequential scanning in four directions.

13. The non-transitory storage medium of claim 10, wherein generating the frequency spectrum for each segment comprises applying a spectrum analysis to each segment using the frequency transform algorithm.

14. The non-transitory storage medium of claim 13, wherein the frequency transform algorithm includes windowed Fourier transform.

15. The non-transitory storage medium of claim 10, wherein storing the data resulting from the coherent enhancement process of each of the one or more dominant signals into separate image buffers comprises:

for each segment, concurrently storing the data resulting from the coherent enhancement process of the one or more dominant signals included in the segment into respective image buffers.

16. The non-transitory storage medium of claim 10, wherein estimating one or more dominant signals corresponding to the image data comprises estimating two or more dominant signals corresponding to the image data.

17. The non-transitory storage medium of claim 10, wherein at least one of the one or more dominant signals corresponding to the image data is associated with a fingerprint image.

18. The non-transitory storage medium of claim 10, wherein the target ridge pattern is a fingerprint ridge pattern.

19. A system comprising:
one or more processors; and
a storage device storing instructions that, when executed by the one or more processors, cause the one or more processors to perform operations comprising:
obtaining an image data;
dividing the image data into a plurality of segments;
generating, using a frequency transform algorithm, a frequency spectrum for each segment;
estimating, for each segment and based on an associated frequency spectrum, one or more dominant signals corresponding to the image data based on a circular histogram for the frequency spectrum associated with each segment;
applying a coherent enhancement process to the one or more dominant signals in each segment by performing sequential scanning in one or more directions;
for each of the one or more dominant signals, storing the data resulting from the coherent enhancement process of the dominant signal into separate image buffers, wherein an image buffer is configured to store data resulting from the coherent enhancement process of an associated dominant signal across multiple segments;
reconstructing each of the one or more dominant signals based on aggregating the data stored in a corresponding image buffer, and
for each of the reconstructed one or more dominant signals:
examining a flow pattern for the dominant signal, based on the examination, determining whether the flow pattern corresponds to a target ridge pattern, and
identifying the dominant signal as a target object in the image data based on determining that the flow pattern corresponds to a target ridge pattern.

20. The system of claim 19, wherein estimating one or more dominant signals for each segment comprises generating the circular histogram for the frequency spectrum associated with each segment by determining histogram probabilities of intensity levels present in the frequency spectrum.

21. The system of claim 19, wherein applying the coherent enhancement process to the one or more dominant signals in each segment by performing sequential scanning in one or more directions comprises:
applying the coherent enhancement process to the one or more dominant signals in each segment by performing sequential scanning in four directions.

22. The system of claim 19, wherein generating the frequency spectrum for each segment comprises applying a spectrum analysis to each segment using the frequency transform algorithm.

23. The system of claim 22, wherein the frequency transform algorithm includes windowed Fourier transform.

24. The system of claim 19, wherein storing the data resulting from the coherent enhancement process of each of the one or more dominant signals into separate image buffers comprises:
for each segment, concurrently storing the data resulting from the coherent enhancement process of the one or more dominant signals included in the segment into respective image buffers.

25. The system of claim 19, wherein estimating one or more dominant signals corresponding to the image data comprises estimating two or more dominant signals corresponding to the image data.

26. The system of claim 19, wherein at least one of the one or more dominant signals corresponding to the image data is associated with a fingerprint image.

27. The system of claim 19, wherein the target ridge pattern is a fingerprint ridge pattern.

* * * * *

UNITED STATES PATENT AND TRADEMARK OFFICE
CERTIFICATE OF CORRECTION

Page 1 of 1

PATENT NO. : 10,275,866 B1
APPLICATION NO. : 15/223442
DATED : April 30, 2019
INVENTOR(S) : Rein-Lien Hsu It is certified that error appears in the above-identified patent and that said Letters Patent is hereby corrected as shown below:

In the Claims

Column 15, Line 32, Claim 1, delete "buffer," and insert -- buffer; --

Column 17, Line 40, Claim 19, delete "buffer," and insert -- buffer; --

Signed and Sealed this
Thirtieth Day of July, 2019

Andrei Iancu
*Director of the United States Patent and Trademark Office*